US009083712B2

(12) United States Patent
Porras et al.

(10) Patent No.: US 9,083,712 B2
(45) Date of Patent: Jul. 14, 2015

(54) METHOD AND APPARATUS FOR GENERATING HIGHLY PREDICTIVE BLACKLISTS

(75) Inventors: Phillip Andrew Porras, Cupertino, CA (US); Jian Zhang, Sunnyvale, CA (US)

(73) Assignee: SRI International, Menlo Park, CA (US)

( * ) Notice: Subject to any disclaimer, the term of this patent is extended or adjusted under 35 U.S.C. 154(b) by 1895 days.

(21) Appl. No.: 12/098,345

(22) Filed: Apr. 4, 2008

(65) Prior Publication Data

US 2009/0064332 A1    Mar. 5, 2009

Related U.S. Application Data

(60) Provisional application No. 60/910,189, filed on Apr. 4, 2007, provisional application No. 61/026,045, filed on Feb. 4, 2008.

(51) Int. Cl.

| G06F 11/00 | (2006.01) |
|---|---|
| G06F 7/00 | (2006.01) |
| H04M 1/66 | (2006.01) |
| H04L 29/06 | (2006.01) |
| H04W 12/10 | (2009.01) |

(52) U.S. Cl.
CPC ............. *H04L 63/101* (2013.01); *H04L 63/105* (2013.01); *H04W 12/10* (2013.01)

(58) Field of Classification Search
CPC .............................. H04L 23/105; H04W 12/10
USPC ................................ 726/25, 22, 23; 709/225
See application file for complete search history.

(56) References Cited

U.S. PATENT DOCUMENTS

| 6,460,141 | B1 * | 10/2002 | Olden ............................... 726/4 |
|---|---|---|---|
| 6,766,458 | B1 * | 7/2004 | Harris et al. ..................... 726/6 |
| 6,941,348 | B2 * | 9/2005 | Petry et al. ................... 709/206 |
| 7,020,783 | B2 * | 3/2006 | Vange et al. ...................... 726/5 |
| 7,043,759 | B2 * | 5/2006 | Kaashoek et al. .............. 726/25 |
| 7,124,440 | B2 * | 10/2006 | Poletto et al. .................. 726/23 |
| 7,188,366 | B2 * | 3/2007 | Chen et al. ...................... 726/23 |
| 7,210,041 | B1 * | 4/2007 | Gryaznov et al. ............. 713/188 |
| 7,281,267 | B2 * | 10/2007 | Tarbotton et al. .............. 726/22 |
| 7,376,969 | B1 * | 5/2008 | Njemanze et al. ............. 726/22 |
| 7,398,317 | B2 * | 7/2008 | Chen et al. .................... 709/229 |
| 7,418,733 | B2 * | 8/2008 | Connary et al. ................ 726/25 |
| 7,448,084 | B1 * | 11/2008 | Apap et al. ..................... 726/24 |
| 7,536,452 | B1 * | 5/2009 | Cao et al. ...................... 709/223 |
| 7,577,239 | B1 * | 8/2009 | Shim et al. ................. 379/88.22 |
| 7,584,507 | B1 * | 9/2009 | Nucci ............................. 726/23 |
| 7,607,169 | B1 * | 10/2009 | Njemanze et al. ............. 726/22 |
| 7,610,624 | B1 * | 10/2009 | Brothers et al. ................ 726/24 |
| 7,634,806 | B2 * | 12/2009 | Zinda et al. .................... 726/22 |
| 7,647,321 | B2 * | 1/2010 | Lund et al. ................... 709/206 |
| 7,647,411 | B1 * | 1/2010 | Schiavone et al. ............ 709/229 |
| 7,650,638 | B1 * | 1/2010 | Njemanze et al. ............. 726/23 |
| 7,697,418 | B2 * | 4/2010 | Rabinovitch .................. 370/218 |

(Continued)

*Primary Examiner* — Arvin Eskandarnia
*Assistant Examiner* — Margishi Desai
(74) *Attorney, Agent, or Firm* — Barnes & Thornburg LLP

(57) ABSTRACT

In one embodiment, the present invention is a method and apparatus for generating highly predictive blacklists. One embodiment of a method for generating a blacklist of network addresses for a user of a network includes collecting security log data from users of the network, the security log data identifying observed attacks by attack sources, assigning the attack sources to the blacklist based on a combination of the relevance each attack source to the user and the maliciousness of the attack source, and outputting the blacklist.

34 Claims, 10 Drawing Sheets

(56) References Cited

U.S. PATENT DOCUMENTS

| | | | |
|---|---|---|---|
| 7,716,729 B2 * | 5/2010 | Bhatia | 726/13 |
| 7,752,665 B1 * | 7/2010 | Robertson et al. | 726/23 |
| 7,788,722 B1 * | 8/2010 | Njemanze et al. | 726/23 |
| 7,818,790 B1 * | 10/2010 | Burns et al. | 726/7 |
| 7,836,498 B2 * | 11/2010 | Poletto et al. | 726/22 |
| 7,849,502 B1 * | 12/2010 | Bloch et al. | 726/11 |
| 7,854,001 B1 * | 12/2010 | Chen et al. | 726/22 |
| 7,958,187 B2 * | 6/2011 | Petry et al. | 709/203 |
| 8,176,527 B1 * | 5/2012 | Njemanze et al. | 726/2 |
| 2002/0002686 A1 * | 1/2002 | Vange et al. | 713/201 |
| 2002/0031134 A1 * | 3/2002 | Poletto et al. | 370/401 |
| 2002/0032880 A1 * | 3/2002 | Poletto et al. | 714/4 |
| 2003/0204621 A1 * | 10/2003 | Poletto et al. | 709/239 |
| 2004/0044912 A1 * | 3/2004 | Connary et al. | 713/201 |
| 2004/0054924 A1 * | 3/2004 | Chuah et al. | 713/201 |
| 2004/0064731 A1 * | 4/2004 | Nguyen et al. | 713/201 |
| 2004/0172557 A1 * | 9/2004 | Nakae et al. | 713/201 |
| 2005/0010817 A1 * | 1/2005 | Jakubik et al. | 713/201 |
| 2005/0015624 A1 * | 1/2005 | Ginter et al. | 713/201 |
| 2005/0021999 A1 * | 1/2005 | Touitou et al. | 713/200 |
| 2005/0182960 A1 * | 8/2005 | Petry et al. | 713/200 |
| 2005/0182969 A1 * | 8/2005 | Ginter et al. | 713/201 |
| 2005/0249214 A1 * | 11/2005 | Peng | 370/392 |
| 2006/0031938 A1 * | 2/2006 | Choi | 726/25 |
| 2006/0059557 A1 * | 3/2006 | Markham et al. | 726/22 |
| 2006/0070128 A1 * | 3/2006 | Heimerdinger et al. | 726/23 |
| 2006/0075084 A1 * | 4/2006 | Lyon | 709/223 |
| 2006/0107321 A1 * | 5/2006 | Tzadikario | 726/22 |
| 2006/0156380 A1 * | 7/2006 | Gladstone et al. | 726/1 |
| 2006/0212572 A1 * | 9/2006 | Afek et al. | 709/225 |
| 2006/0259967 A1 * | 11/2006 | Thomas et al. | 726/22 |
| 2006/0265459 A1 * | 11/2006 | Petry et al. | 709/206 |
| 2007/0050461 A1 * | 3/2007 | Petry et al. | 709/206 |
| 2007/0050777 A1 * | 3/2007 | Hutchinson et al. | 718/104 |
| 2007/0067844 A1 * | 3/2007 | Williamson et al. | 726/24 |
| 2007/0100905 A1 * | 5/2007 | Masters et al. | 707/201 |
| 2007/0101432 A1 * | 5/2007 | Carpenter | 726/25 |
| 2007/0156830 A1 * | 7/2007 | Petry et al. | 709/206 |
| 2007/0157311 A1 * | 7/2007 | Meier et al. | 726/22 |
| 2007/0208822 A1 * | 9/2007 | Wang et al. | 709/217 |
| 2007/0209067 A1 * | 9/2007 | Fogel | 726/11 |
| 2007/0286085 A1 * | 12/2007 | Rabinovitch | 370/241 |
| 2007/0294766 A1 * | 12/2007 | Mir et al. | 726/23 |
| 2008/0082662 A1 * | 4/2008 | Dandliker et al. | 709/225 |
| 2008/0130895 A1 * | 6/2008 | Jueneman et al. | 380/277 |
| 2008/0196104 A1 * | 8/2008 | Tuvell et al. | 726/24 |
| 2009/0077666 A1 * | 3/2009 | Chen et al. | 726/25 |
| 2009/0083855 A1 * | 3/2009 | Apap et al. | 726/24 |
| 2009/0293128 A1 * | 11/2009 | Lippmann et al. | 726/25 |
| 2010/0031315 A1 * | 2/2010 | Feng et al. | 726/3 |
| 2010/0049975 A1 * | 2/2010 | Parno et al. | 713/168 |
| 2012/0260306 A1 * | 10/2012 | Njemanze et al. | 726/1 |
| 2013/0290356 A1 * | 10/2013 | Yang et al. | 707/755 |

* cited by examiner

|     | $u_1$ | $u_2$ | $u_3$ | $u_4$ | $u_5$ |
|-----|-------|-------|-------|-------|-------|
| $S_1$ | * | * |   |   |   |
| $S_2$ | * | * |   |   |   |
| $S_3$ | * |   | * |   |   |
| $S_4$ |   | * | * |   |   |
| $S_5$ |   | * |   |   |   |
| $S_6$ |   |   |   | * | * |
| $S_7$ |   |   | * |   |   |
| $S_8$ |   |   | * | * |   |

METHOD AND APPARATUS FOR GENERATING HIGHLY PREDICTIVE BLACKLISTS

CROSS REFERENCE TO RELATED APPLICATIONS

This application claims the benefit of U.S. Provisional Patent Application No. 60/910,189, filed Apr. 4, 2007, and U.S. Provisional Patent Application No. 61/026,045, filed Feb. 4, 2008, both of which are herein incorporated by reference in their entireties.

REFERENCE TO GOVERNMENT FUNDING

This invention was made with Government support under contract number W911NF-06-1-0316 awarded by the Army Research Office. The Government has certain rights in this invention.

FIELD OF THE INVENTION

The present invention generally relates to network security, and more particularly relates to the generation of network address blacklists.

BACKGROUND OF THE DISCLOSURE

A network address blacklist represents a collection of source Internet Protocol (IP) addresses that have been deemed undesirable, where typically these addresses have been involved in previous illicit activities (e.g., network attacks). One way to generate network address blacklists is to regularly solicit security log entries from voluntary contributors distributed across the Internet and to compile and post firewall-parsable blacklists of the most prolific attack sources seen by these contributors. A smaller-scale solution creates local blacklists based entirely on an individual network's history of incoming communications.

Although both approaches are relatively effective in defending a network against known attack sources, neither provides the capability to include an attack source's address before the attack source has saturated the network. Thus, a prolific attack source may cause serious damage before it can be identified and included in a network blacklist.

Thus, there is a need in the art for a method and apparatus for generating highly predictive blacklists.

SUMMARY OF THE INVENTION

In one embodiment, the present invention is a method and apparatus for generating highly predictive blacklists. One embodiment of a method for generating a blacklist of network addresses for a user of a network includes collecting security log data from users of the network, the security log data identifying observed attacks by attack sources, assigning the attack sources to the blacklist based on a combination of the relevance each attack source to the user and the maliciousness of the attack source, and outputting the blacklist.

BRIEF DESCRIPTION OF THE DRAWINGS

The teachings of the present invention can be readily understood by considering the following detailed description in conjunction with the accompanying drawings, in which:

FIG. 3 is a table 300 illustrating the concept of attack source relevance;

To facilitate understanding, identical reference numerals have been used, where possible, to designate identical elements that are common to the figures.

DETAILED DESCRIPTION

In one embodiment, the invention is a method and apparatus for generating highly predictive blacklists. Embodiments of the invention generate customized blacklists based at least in part on a relevance ranking scheme that measures how closely related an attack source is to the network for which the blacklist is generated. Further embodiments of the invention integrate substantive pre-filtering of network security logs and a severity metric that captures the degree to which an attack source's alert patterns match the patterns of common malware-propagation behavior. Customized blacklists generated in accordance with the present invention proactively incorporate attack source addresses before the attack sources reach the blacklist user network.

It should be noted that although the present invention is disclosed below in the context of IP addresses represented by 32 bits, the present invention is not so limited. Namely, an IP address should be broadly interpreted to comprise an individual IP address or a group of IP addresses, e.g., as in the case of a 24-bit network IP address serving as a netmask.

Furthermore, the present invention is not limited to a particular version of the IP protocol, e.g., IPv4, or IPv6. The present invention can be adapted to any versions of the IP protocol or other communications protocol.

Figure 1:
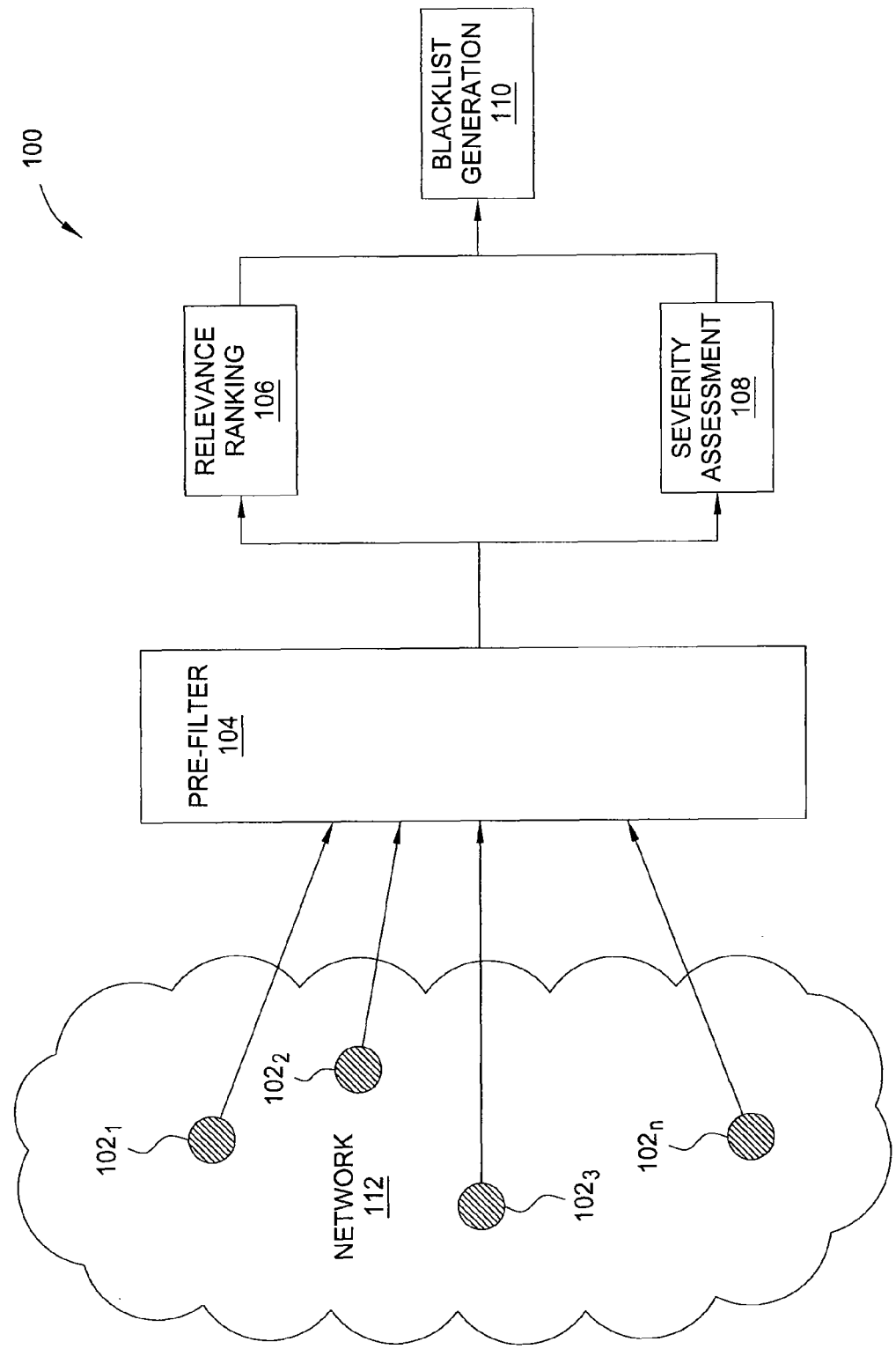
FIG. 1 is a schematic diagram illustrating one embodiment of a system for generating network address blacklists, according to the present invention.

FIG. 1 is a schematic diagram illustrating one embodiment of a system 100 for generating network address blacklists, according to the present invention. The blacklist generation system 100 relies on users to voluntarily contribute security log data to a collaborative, centralized log-sharing infrastructure.

As illustrated, the blacklist generation system 100 comprises a plurality of sensors $102_1$-$102_n$ (hereinafter collectively referred to as "sensors 102"), a pre-filtering module 104, a relevance ranking module 106, a severity assessment module 108, and a blacklist generation module 110. The operations of these components are discussed briefly below, and discussed in greater detail with respect to FIGS. 2-4.

The sensors 102 are distributed across a network 112 (e.g., the Internet) and collect security log data from network users who participate in the blacklist generation system 100. In one embodiment, the security log data comprises security alerts indicative of attempted attacks and specifying the attack sources.

The sensors 102 supply the security log data to the pre-filtering module 104, where the security log data is pre-processed to remove known noises and erroneous data from the collected data. In one embodiment, data removed by the pre-filtering module 104 comprises log entries that arise from non-hostile activity or log entries that arise from activity from which useful filters cannot be reliably derived. In one embodiment, the pre-filtering module 104 removes from consideration log entries that match criteria that have been empirically identified as commonly occurring non-useful input for blacklist generation purposes.

The pre-filtering module 104 supplies the pre-processed security log data to the relevance ranking module 106 and the severity assessment module 108, which process the data in parallel. Specifically, the relevance ranking module 106 ranks, for each user of the blacklist generation system 100, the attack sources according to their relevance to the specific user. The ranking also reflects the likelihood that an attack source will attempt to attack the user in the near future. The relevance ranking is orthogonal to metrics that measure the severity (or benignness) of the attack source, discussed in further detail with respect to the severity assessment module 108.

The severity assessment module 108 scores the attack sources using a severity assessment that measures the maliciousness of each attack source.

The relevance ranking module 106 and the severity assessment module 108 provide their rankings and scores to the blacklist generation module 110, which combines the relevance rankings and the severity scores for each user in order to generate a final blacklist for that user.

Figure 2:
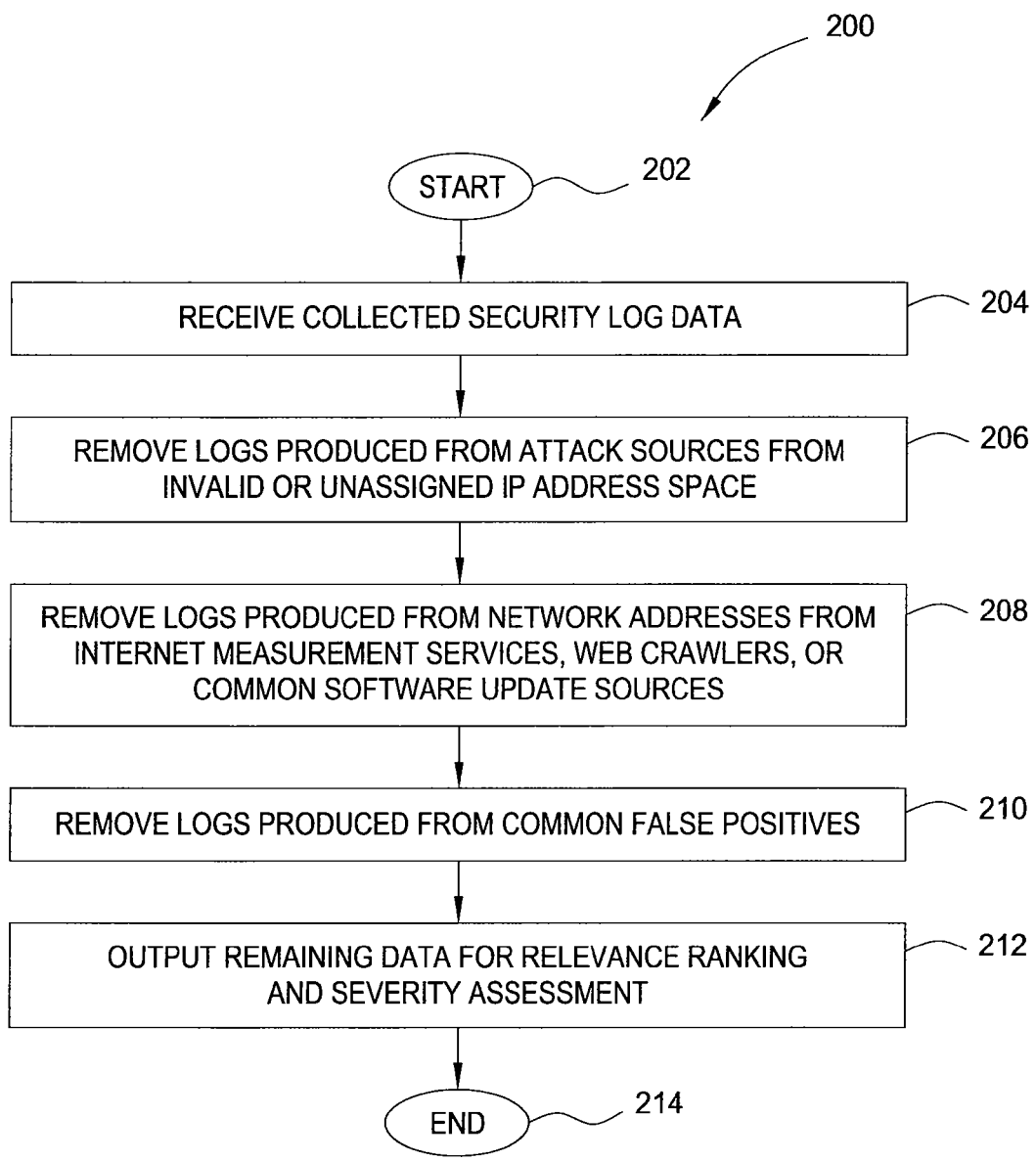
FIG. 2 is a flow diagram illustrating one embodiment of a method for pre-processing collected security log data, according to the present invention.

FIG. 2 is a flow diagram illustrating one embodiment of a method 200 for pre-processing collected security log data, according to the present invention. The method 200 may be implemented, for example, by the pre-filtering module 104 of the blacklist generation system 100, illustrated above.

The method 200 is initialized at step 202 and proceeds to step 204, where the method 200 receives security log data collected, for example, by a plurality of sensors (e.g., sensors 102 of the system 100).

In step 206, the method 200 removes security log data that is produced from attack sources from invalid or unassigned IP address space. In one embodiment, removal of this security log data is performed by applying the "bogon dotted decimal list" described by R. Thomas (www.cymru.com/Documents/bogon-dd.html), which is herein incorporated by reference in its entirety. Application of this list captures addresses that are reserved, not yet allocated, or delegated by the Internet Assigned Number Authority (IANA). Typically, such addresses should not be routed, but they do appear anyway in common security log data. In addition, reserved addresses (e.g., the 10.x.x.x or 192.168.x.x) that are not useful for generating blacklists may also appear in misconfigured user security logs.

In step 208, the method 200 removes security log data produced from network addresses from Internet measurement services, from web crawlers, or from common software update sources. In one embodiment, removal of this security log data is performed by applying a "whitelist" of highly common sources that, while innocuous from an intrusion perspective, often generate alerts in user security logs.

In step 210, the method 200 removes logs produced from common false positives, such as those that arise from commonly timed-out network services. In one embodiment, removal of this security log data is performed by applying heuristics that remove logs produced from source ports transmission control protocol (TCP) 53 (domain name system (DNS)), 25 (simple mail transfer protocol (SMTP)), 80 (hypertext transfer protocol (HTTP)), and 443 (often used for secure web, Internet message access protocol (IMAP), and virtual private networks (VPNs)). In a further embodiment, the heuristics remove logs produced from destination ports TCP 53 and 25. Firewalls will commonly time out sessions from these services when the server or client becomes unresponsive or is slow.

Having removed the noise and erroneous data in steps 206, 208, and 210, the method 200 outputs the remaining data for relevance ranking and severity assessment in step 212. The method 200 then terminates in step 214.

Experimental results have shown that pre-processing of the collected security log data in accordance with the method 200 provides approximately a ten percent reduction in the volume of data provided for further processing by the blacklist generation system.

As discussed above in connection with FIG. 1, part of the blacklist generation process involves ranking attack sources according to their relevance to specific users. Recent research has observed that pairs of blacklist generation system users share a number of common attack sources, where a common attack source is defined as a source address that both users have logged and reported to the blacklist generation system. This research also observed that this attack source overlap phenomenon is not due to attacks that select targets randomly (e.g., random scans). Rather, the correlations are long-lived, and many of the correlations are independent of address proximity. Embodiments of the present invention exploit these overlapping relationships in order to measure attacker relevance to specific users.

Figure 3:
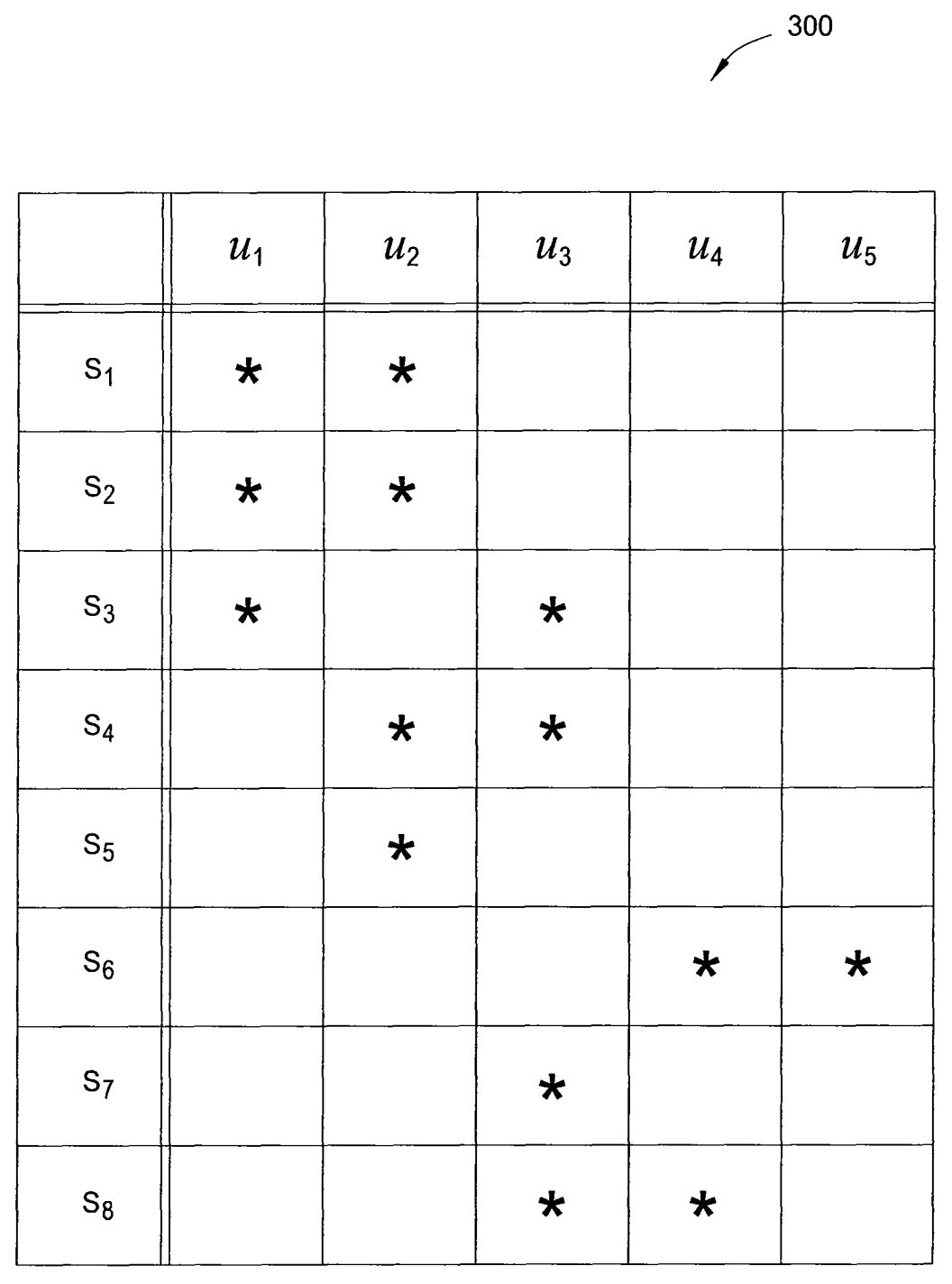

FIG. 3 is a table 300 illustrating the concept of attack source relevance. Specifically, FIG. 3 displays an exemplary collection of security log data in tabular form. The rows of the table 300 represent attack sources $s_1$-$s_8$, while the columns of the table 300 represent users $u_1$-$u_5$ of the blacklist generation system. An asterisk in a cell of the table 300 indicates that the corresponding attack source has reportedly attacked the corresponding user. Although the table 300 illustrates data related to fourteen security logs involving eight attack sources and five users, it will be appreciated that this data is provided by way of example only, and that the actual data collected by a blacklist generation system according to the present invention may relate to any number security logs involving any number of attack sources and any number of users.

From the table 300, it can be observed that users $u_1$ and $u_2$ share multiple common attack sources (i.e., $s_1$ and $s_2$). User $u_1$ also shares one common attack source (i.e., $s_3$) with user $u_3$, but does not share any common attack sources with any other users. Given this observation, between attack sources $s_5$ and $s_6$, it can be said that attack source $s_5$ has more relevance to user $u_1$ than attack source $s_6$, because attack source $s_5$ has reportedly attacked user $u_2$, who has recently experienced multiple attack source overlaps with user $u_1$. However, the users reportedly attacked by attack source $s_6$ (i.e., $u_4$ and $u_5$) share no overlap with user $u_1$. Note that this relevance measure is quite different from measures based on how prolific the attack source has been (in which case, attack source $s_6$ would be favored over attack source $s_5$, since attack source $s_6$ has attacked more users than attack source $s_5$). In this sense, which users an attack source has attacked is of greater significance than how many users the attack source has attacked.

Similarly, between attack source $s_5$ and attack source $s_7$, attack source $s_5$ is more relevant to the user $u_1$, because the user attacked by attack source $s_5$ (i.e., $u_2$) shares more common attacks with the user $u_1$ than the user attacked by attack source $s_7$ (i.e., $u_3$). Finally, because attack source $s_4$ has attacked both user $u_2$ and user $u_3$, it can be said that attack source $s_4$ is most relevant among attack sources $s_4$, $s_5$, $s_6$, and $s_7$ to user $u_1$.

The relevance model uses the following notation: Let n be the number of nodes (i.e., number of users) in the correlation graph. W denotes the adjacency matrix of the correlation graph, where the entry $W_{(i,j)}$ in the adjacency matrix is the weight of the edge between node $u_i$ and node $u_j$. T(s) denotes the set of users who have reported an attack from attack source s. T(s) can be written in a vector form as $b^s=\{b_1^s, b_2^s, \ldots, b_n^s\}$, such that $b_i^s=1$ if $u_j \in T(s)$ and $b_i^s=0$ if $u_i \notin T(s)$. Each attack source, s, is also associated with a relevance vector, $r^s\{r_1^s, r_2^s, \ldots, r_n^s\}$, such that $r_u^s$ is the relevance of attack source s with respect to user u.

The adjacency matrix, W, is derived as follows: Consider two cases. In the first case, user $u_i$ reports attacks from five hundred attack sources, and user $u_j$ reports attacks from ten attack sources. Five of these attack sources attack both user $u_i$ and user $u_j$. In the second case, user $u_i$ reports attacks from fifty attack sources, and user $u_j$ reports attacks from ten attack sources. In the second case, five of these attack sources attack both user $u_i$ and user $u_j$. Although the number of common attack sources is the same in both cases (i.e., five), the strength of the connection between $u_i$ and user $u_j$ differs. If a user reports many attacks, it is expected that the user should have more attack sources in common with other users.

Let $m_i$ be the number of attack sources reported by the user $u_i$; $m_j$ be the number of attack sources reported by the user $u_j$; and $m_{ij}$ be the number of attack sources users $u_i$ and $u_j$ share in common. The ratio $$\frac{m_{ij}}{m_i}$$

shows how important user $u_i$ is to user $u_j$, while the ratio $$\frac{m_{ij}}{m_j}$$

shows how important user $u_j$ is to user $ui_i$. Since the entry $W_{(i,j)}$ in the adjacency matrix reflects the strength of the connection between user $u_i$ and user $u_j$, the entry $$W_{(i,j)} = I \frac{m_{ij}}{m_i} \cdot \frac{m_{ij}}{m_j}.$$

One may view this new adjacency matrix W as a standardized correlation matrix. Referring back to the exemplary table of FIG. 3, a corresponding adjacency matrix W may be constructed as:

$$\begin{pmatrix} 0 & 0.33 & 0.083 & 0 & 0 \\ 0.33 & 0 & 0.063 & 0 & 0 \\ 0.083 & 0.063 & 0 & 0.13 & 0 \\ 0 & 0 & 0.13 & 0 & 0.5 \\ 0 & 0 & 0 & 0.5 & 0 \end{pmatrix}$$

Given the above standardized correlation matrix and intuition, the relevance $r_i^s$ may be calculated as:

$$r_i^s = \Sigma_{j \in t(s)} W_{(i,j)} \qquad \text{(EQN. 1)}$$

This is to say that if the collected security log data reports that attack source s has attacked user $u_j$, this fact contributes a value of $W_{(i,j)}$ to the attack source's relevance with respect to the user $u_i$. Written in vector form, this gives:

$$r^s = W \cdot b^s \qquad \text{(EQN. 2)}$$

A relevance value calculated in accordance with EQN. 2 is calculated solely from the attack source's activities as observed by users of the blacklist generation system (who contribute their security logs to the system). In some cases, such observations do not represent the complete view of the attack source's activities. One reason for this is that the users comprise only a very small set of networks in the Internet. Before an attack source saturates the Internet with malicious activity, it is often the case that only a few users have observed the attack source's activity. The activity of the attack source may be in an early stage, or the attack source may have attacked many users who do not participate in or contribute to the blacklist generation system. Thus, it may be desirable to construct a relevance measure that has a predictive capability. That is, the calculation of a relevance value for a given attack source should account for possible future observations of the attack source and include these anticipated observations from the users into the calculation.

Figure 4:
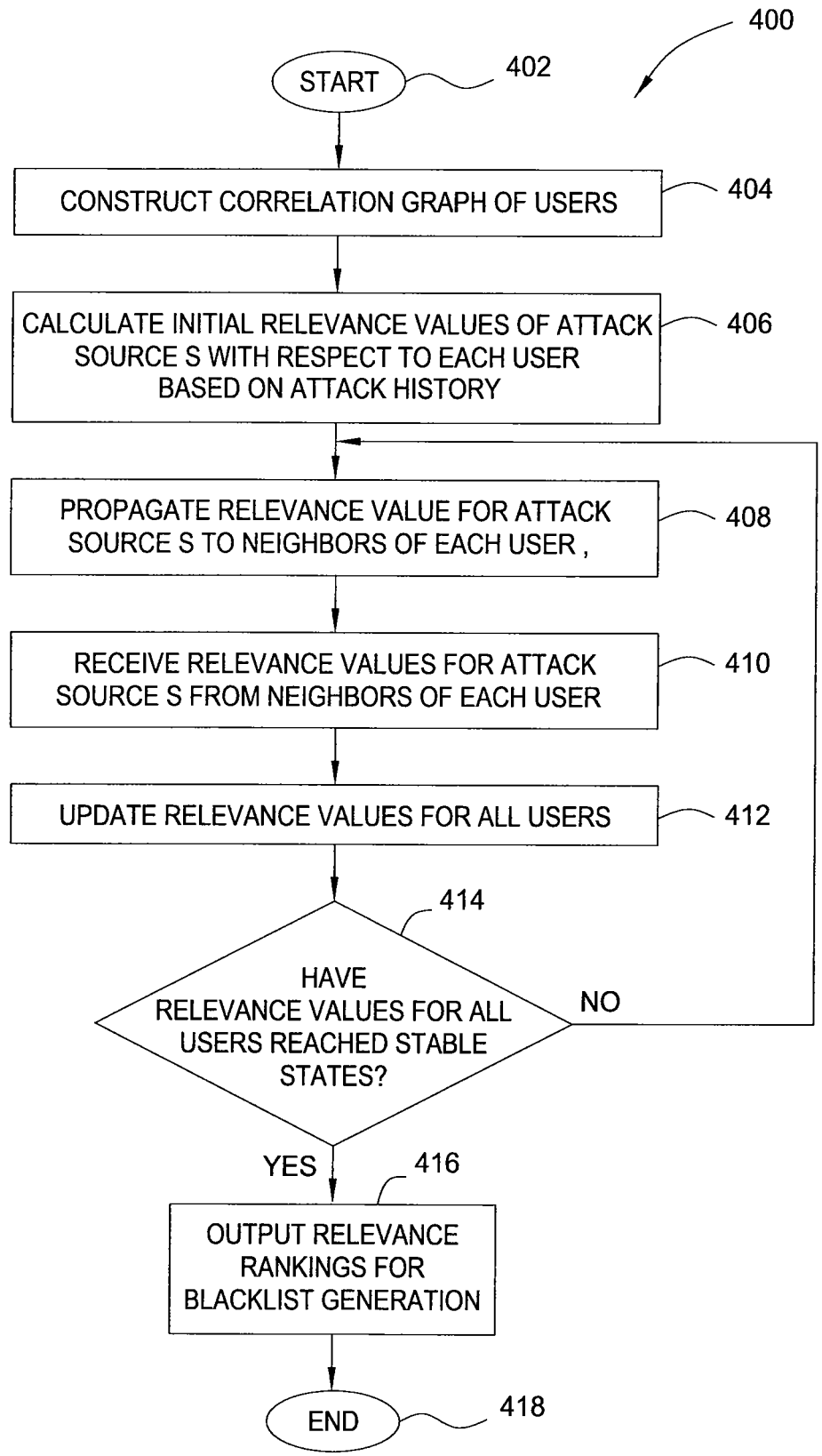
FIG. 4 is a flow diagram illustrating one embodiment of a method for generating predictive relevance values for an attack source with respect to users of the blacklist generation system, according to the present invention.

FIG. 4 is a flow diagram illustrating one embodiment of a method 400 for generating predictive relevance values for an attack source with respect to users of the blacklist generation system, according to the present invention. The method 400 may be implemented, for example, by the relevance ranking module 106 of the blacklist generation system 100, illustrated above. The method 400 formalizes the intuition discussed above with respect to FIG. 3.

The method 400 is initialized at step 402 and proceeds to step 404, where the method 400 models the attack correlation relationship between users as a correlation graph, which is a weighted undirected graph G=(U, E). The nodes in the correlation graph consist of the users, U=$\{u_1, u_2, \ldots, u_n\}$. An edge exists between node $u_i$ and node $u_j$ if $u_i$ is correlated with $u_j$. The weight on this edge is determined by the strength of the correlation (i.e., occurrences of attack source overlap) between the users corresponding to the nodes.

In step 406, the method 400 calculates initial relevance values for the attack source, s, with respect to each user. The initial relevance value calculated for a given user is based on the attack history of the attack source, s, with respect to the given user (e.g., as discussed above).

In step 408, the method 400 propagates the relevance values calculated in step 406 to the neighbors of each user (i.e., the users or nodes that reside within one hop of each user in the correlation graph). In one embodiment, a relevance value that is propagated from a given user to the user's neighbor is weighted in accordance with the weight of the edge that exists between the given user and the user's neighbor, to give a correlated relevance score for the attack source, s, with respect to the user's neighbor.

Figure 5:
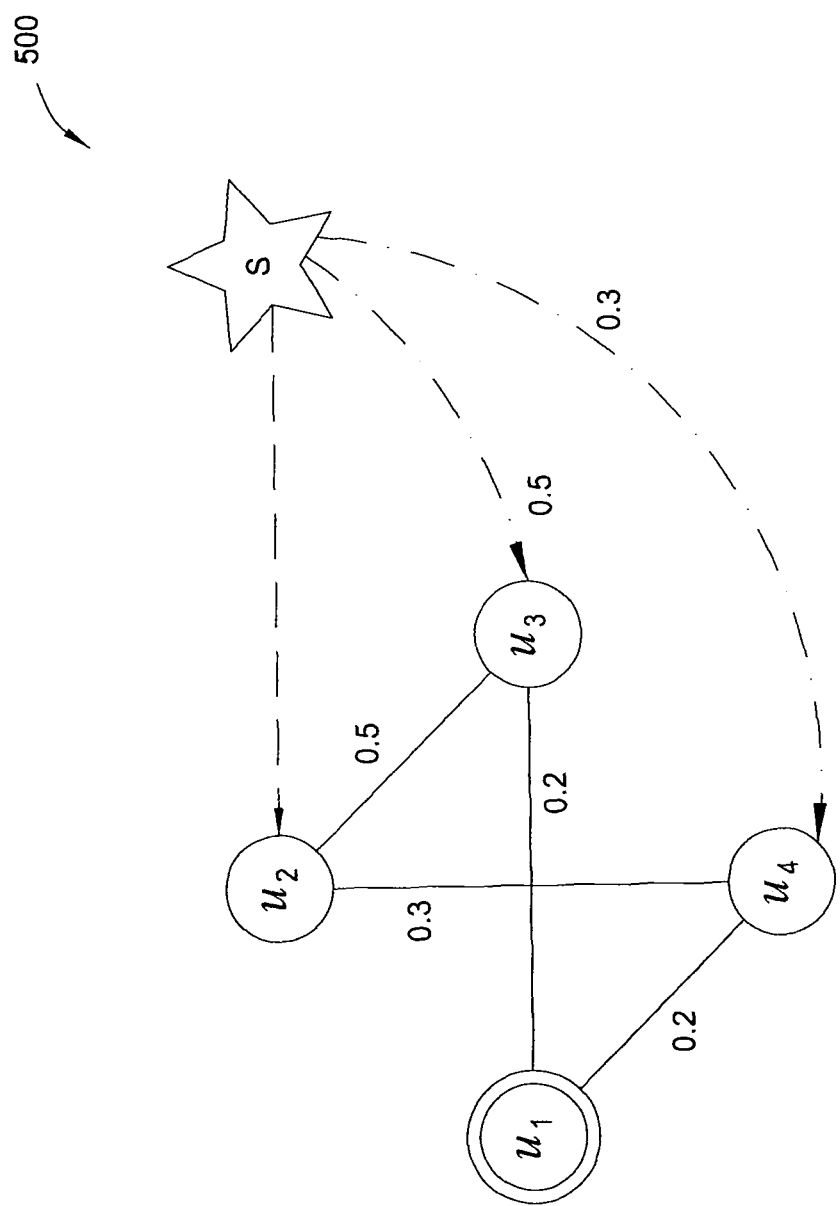
FIG. 5 is an exemplary correlation graph illustrating one way to calculate a predictive relevance value in accordance with the method.

FIG. 5 is an exemplary correlation graph 500 illustrating one way to calculate a predictive relevance value in accordance with the method 400. Although similar notation is used to designate users and attack sources, the example illustrated in FIG. 5 is independent of the table 300 illustrated in FIG. 3.

The correlation graph 500 comprises four users $u_1$-$u_4$. User $u_2$'s security log reports an attack from attack source s. Based on this information, the goal is to evaluate how relevant the attack source s is to user $u_1$. Using EQN. 2, the answer would be zero. However, it is observed that the attack source s has a relevance value of 0.5 with respect to user $u_3$ and a relevance value of 0.3 with respect to user $u_4$. Though users $u_3$ and $u_4$ have not observed an attack by the attack source s yet, attack source s may attack users $u_3$ and $u_4$ in the future. In anticipation of such future attacks, when the attack source s's relevance to user $u_1$ is evaluated, users $u_3$ and $u_4$ pass to user $u_1$ their respective relevance values multiplied by the weights of their respective edges. The attack source s's relevance with respect to user $u_1$ is then $(0.5)(0.2)+(0.3)(0.2)=0.16$. Note that had the attack source s actually attacked users $u_3$ and $u_4$, users $u_3$ and $u_4$ would have passed a relevance value of one (multiplied by the respective weights of the edges) to user $u_1$.

After the relevance values for attack source s have been propagated to user, the method 400 proceeds to step 410 and receives, at each user, relevance values for the attack source, s, that have been propagated from neighbors. The method 400 then proceeds to step 412 and updates the relevance values for all of the users, based on the relevance values received in step 410.

In step 414, the method 400 checks to see whether the relevance values for the attack source s with respect to all users have reached a stable state (i.e., a state in which the relevance values do not change from the relevance values obtained during the previous iteration of relevance value propagation). If the method 400 concludes in step 414 that the relevance values for the attack source s with respect to all users have reached a stable state, the method 400 proceeds to step 416 and outputs the relevance rankings for blacklist generation (e.g., to blacklist generation module 110). The method 400 then terminates in step 420.

Alternatively, if the method 400 concludes in step 414 that the relevance values for the attack source s with respect to all users have not reached a stable state, the method 400 returns to step 408 and proceeds as described above to propagate the updated relevance values (i.e., the relevance values updated in step 412). Thus, the method 400 is an iterative process that repeats until the relevance values of all users have reached a steady state.

Thus, the above can be viewed as a relevance propagation process. If a user $u_i$ is attacked by an attack source, one can say that the attack source has an initial relevance value of one for that user $u_i$. Following the edges that leave the user $u_i$, fractions of this initial relevance value are distributed to the neighboring users u of the user $u_i$. Each of the neighboring users of user $u_i$ receives a share of the relevance value that is proportional to the weight of edge that connects the neighboring user u to the user $u_i$. Suppose, for example, that one of user $u_i$'s neighbors is user $u_j$. A fraction of the relevance value received by user $u_j$ is further propagated to user $u_j$'s neighbors. This propagation of relevance values continues until the relevance values for all users reach stable states.

Figure 6A:
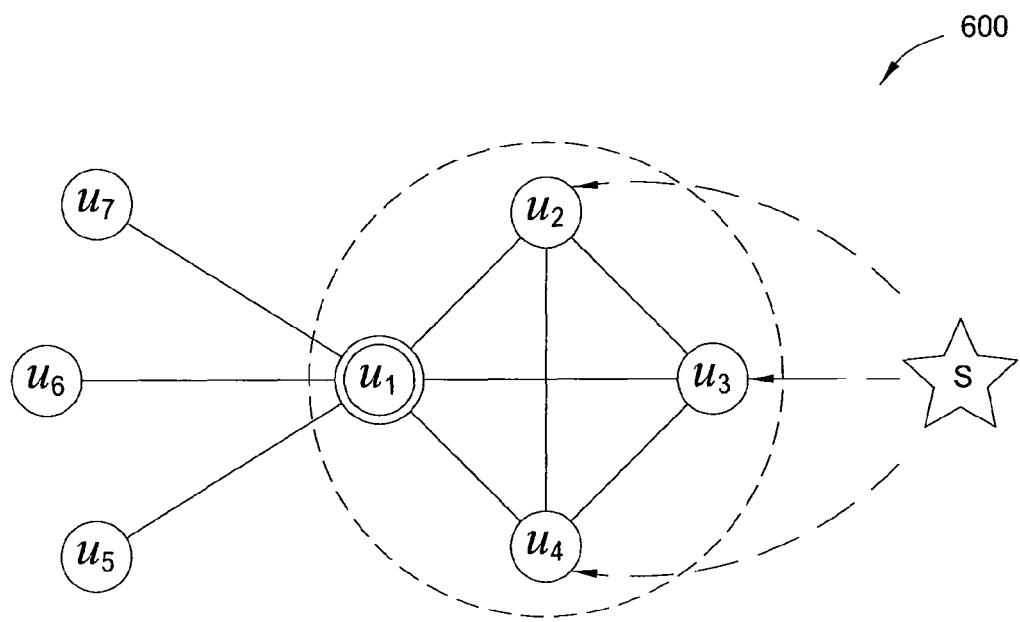
FIGS. 6A-6B illustrate exemplary correlation graphs that demonstrate a further advantage of the present invention.
Figure 6B:
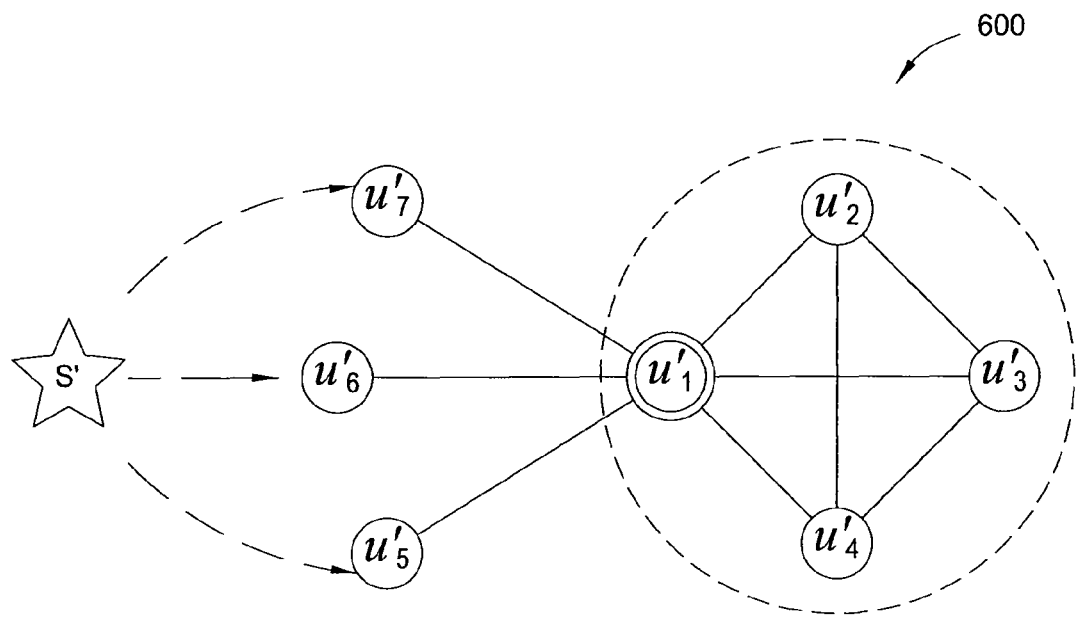

This relevance propagation process conveys another benefit in addition to the predicative capability. FIGS. 6A-6B illustrate exemplary correlation graphs 600 that demonstrate a further advantage of the present invention. Although similar notation is used to designate users and attack sources, the examples illustrated in FIGS. 6A-6B are independent of the table 300 illustrated in FIG. 3.

As illustrated, the correlation graph 600 comprises two sub-graphs: (1) a first sub-graph formed by users $u_1$, $u_2$, $u_3$, and $u_4$; and (2) a second sub-graph formed by users $u_1$, $u_5$, $u_6$, and $u_7$. The first sub-graph is well-connected; that is, the users in the first sub-graph (i.e., the users within the dashed circle) are more "tied together" than the users in the second sub-graph. The users of the first sub-graph are thus referred to as a "correlated group".

There may be certain intrinsic similarities (e.g., IP address proximity, similar vulnerability) between the users in the correlated group. Thus, it is natural to assign more relevance to attack source addresses that have attacked other users in the same correlated group. For example, consider the attack source s in FIG. 6A and the attack source s' in FIG. 6B. Attack source s and attack source s' have both attacked three users. All of the edges are assumed to have the same weights. It can be said that attack source s is more relevant than attack source s' with respect to user $u_1$. However, if the relevance values of attack sources s and s' with respect to user $u_1$ are calculated in accordance with EQN. 2, the relevance values would be the same.

Relevance value propagation, as discussed above, assigns a greater value to attack source s, because members of the correlated group are well-connected. That is, there are more paths in the first sub-graph that lead from the users who were attacked (i.e., users $u_2$, $u_3$, and $u_4$) to the user for whom the attack source relevance is being evaluated (i.e., user $u_1$). For example, the relevance value from user $u_2$ can propagate to user $u_3$, and then to user $u_1$. The relevance value from user $u_4$ can also propagate to user $u_1$. This is effectively the same as having an edge with a larger weight between users $u_1$ and $u_2$. Thus, relevance value propagation can effectively discover and adapt to the structures in the correlation graph. The assigned relevance values then reflect certain intrinsic relationships among users.

EQN. 2 can be extended to employ relevance value propagation. Specifically, if the relevance values are propagated to immediate neighbors in a correlation graph, a relevance vector $W \cdot b^s$ is obtained, where the relevance vector represents the propagated relevance values. Relevance values are then propagated one more hop, giving $W \cdot W \cdot b^s = W^2 \cdot b^s$. The relevance vector that reflects the total relevance value each user receives is then $W \cdot b^s + W^2 \cdot b^s$. If the propagation process is allowed to iterate indefinitely, the relevance vector becomes $$\sum_{i=1}^{\infty} W^i \cdot b^s.$$

A technical detail in this process must be resolved. It is desirable for the relevance value to decay along the path of propagation; the further the relevance value is propagated, the smaller its contribution should become. To achieve this, the standardized correlation matrix W is scaled by a constant $0<\alpha<1$ such that the 2-norm of the new matrix $\alpha W$ becomes smaller than one. With this modification, an attack source will have only a negligible relevance value to users who are far away in the correlation graph. Putting the above together, the relevance vector is computed as:

$$r^s = \sum_{i=1}^{\infty} (\alpha W)^i \cdot b^s \qquad \text{(EQN. 3)}$$

It is observed that $b^s + r^s$ is the solution for x in the following linear system:

$$x = b^s + \alpha W \cdot x \qquad \text{(EQN. 4)}$$

EQN. 4 can be solved to give $x=(I-\alpha W)^{-1} \cdot b^s$, where I is the identity matrix. Also, since $x=r^s+b^s$, $r^s=(I-\alpha W)^{-1} \cdot b^s - b^s = [(I-$ $\alpha W)^{-t} - I] \cdot b^s$. This gives the relevance vector for each attack source. The attack sources are then ranked, for each user, according to the relevance values. As each attack source has a potentially different relevance value for each user, the rank of an attack source with respect to different users is different. The concept of relevance values and relevance propagation does not depend on a particular choice of the standardized correlation matrix W. As long as the standardized correlation matrix W reflects the connection weight between the users, the relevance value applies.

As discussed above in connection with FIG. 1, another part of the blacklist generation process involves measuring the degree to which each attack source exhibits known patterns of malicious behavior. As also discussed above, this measure is fused into the final blacklist generation decisions.

In one embodiment, the model of malicious behavior focuses on identifying typical scan-and-infect malicious software (malware). In one embodiment, a malware behavior pattern is defined as the behavior of an attack source who conducts an IP sweep to small sets of ports that are known to be associated with malware propagation or backdoor access. In other embodiments, other potential malware behavior patterns are applied, such as the scan-oriented malicious address detection schemes outlined in the context of dynamic signature generation and malicious port scan analysis. Regardless of the malware behavior pattern applied, the design and integration of other severity metrics into the final blacklist generation process can be carried out in a similar manner.

For a set of security log entries over a relevance-calculation time window several attributes are calculated for each attack source's/24 network address. For each attack source, a score is assigned to target ports associated with the attack source, assigning different weights depending on whether the port is associated with known malware communications.

Let MP be the set of malware-associated ports, where the following definition is used:

$$\begin{pmatrix} 53\text{-}UDP & 69\text{-}UDP & 137\text{-}UDP & 21\text{-}TCP & 53\text{-}TCP & 42\text{-}TCP \\ 135\text{-}TCP & 139\text{-}TCP & 445\text{-}TCP & 559\text{-}TCP & 1025\text{-}TCP & 1433\text{-}TCP \\ 2082\text{-}TCP & 2100\text{-}TCP & 2283\text{-}TCP & 2535\text{-}TCP & 2745\text{-}TCP & 2535\text{-}TCP \\ 3127\text{-}TCP & 3128\text{-}TCP & 3306\text{-}TCP & 3410\text{-}TCP & 5000\text{-}TCP & 5554\text{-}TCP \\ 6101\text{-}TCP & 6129\text{-}TCP & 8866\text{-}TCP & 9898\text{-}TCP & 10000\text{-}TCP & 10080\text{-}TCP \\ 12345\text{-}TCP & 11768\text{-}TCP & 15118\text{-}TCP & 17300\text{-}TCP & 27374\text{-}TCP & 65506\text{-}TCP \\ 4444\text{-}TCP & 9995\text{-}TCP & 9996\text{-}TCP & 17300\text{-}TCP & 3140\text{-}TCP & 9033\text{-}TCP \\ 1434\text{-}UDP & & & & & \end{pmatrix}$$

This MP is derived from various access violation (AV) lists and experience. This list is by no means complete, and may be expanded across the life of the blacklist generation system. However, experimental observations in live malware analysis indicate that the entries in MP are both highly common and highly indicative of malware propagation.

Figure 7:
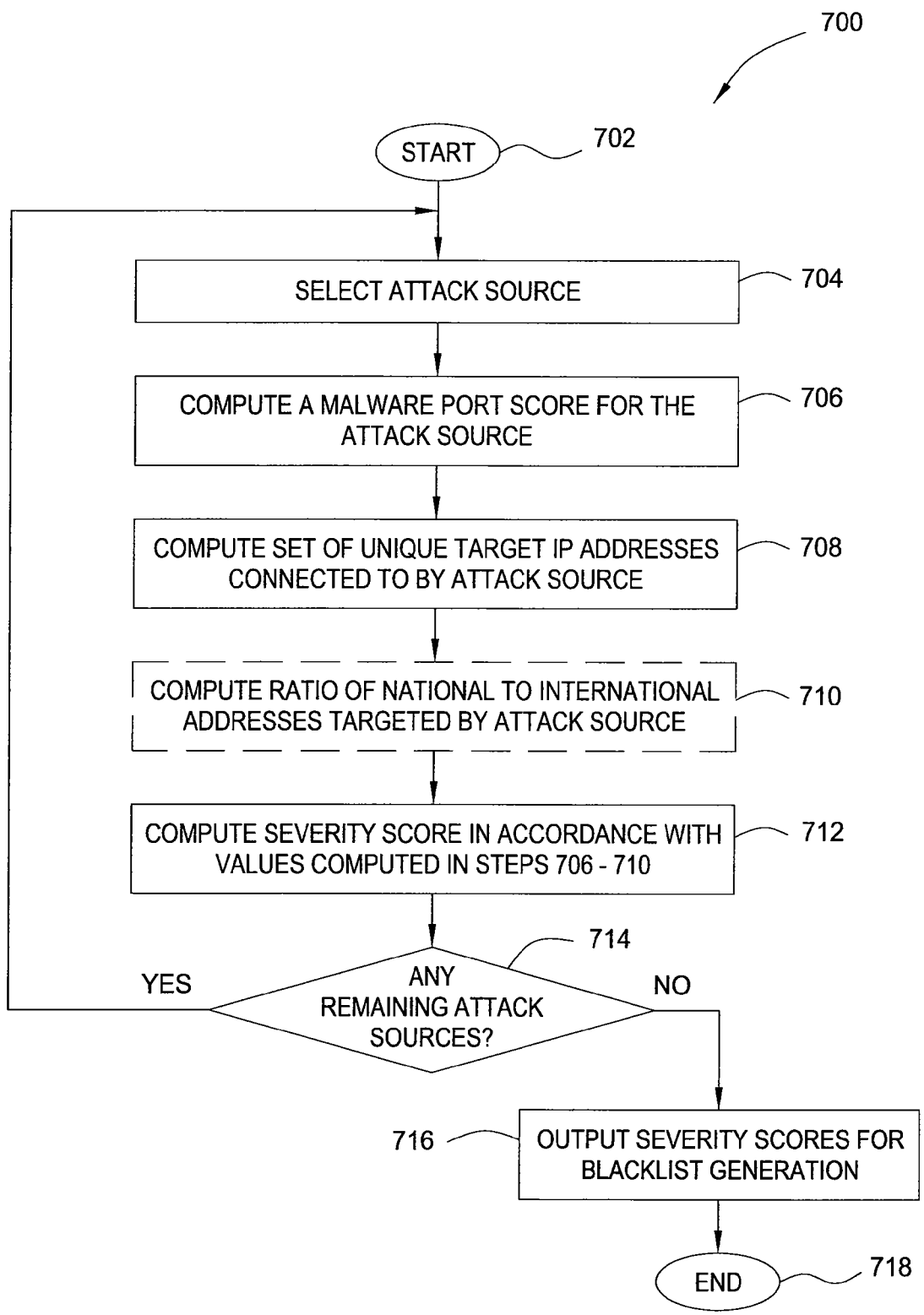
FIG. 7 is a flow diagram illustrating one embodiment of a method for generating a severity score for an attack source, according to the present invention.

FIG. 7 is a flow diagram illustrating one embodiment of a method 700 for generating a severity score for an attack source, according to the present invention. The method 700 may be implemented, for example, by the severity assessment module 108 of the blacklist generation system 100, illustrated above. In one embodiment, the severity score combines two to three different factors, discussed in greater detail below.

The method 700 is initialized at step 702 and proceeds to step 704, where the method 700 selects an attack source, s. In step 706, the method 700 computes a malware port score, PS, for the selected attack source, s. In one embodiment, the malware port score, PS, is the primary factor considered in the severity score. In one embodiment, the malware port score is calculated as follows:

Let the number of target ports that attack source s connects to be $c_m$, and the total number of unique ports connected to be defined as $c_u$. A weighting (or importance) factor, $w_m$, is associated for all ports in MP, and a weighting factor, $w_u$, is associated for all non-malware ports. A malware port score (PS) metric is then computed for each attack source as:

$$PS(s) = \frac{(w_u \times c_u) + (w_m \times c_m)}{c_u} \quad \text{(EQN. 5)}$$

Here, it is intended that the weighting $w_m$ be greater than the weighting $w_u$, and an initial default of $w_m = 4w_u$ is chosen. Even if a large number $c_m$ of ports that connect to attack source s are found, if the number $c_u$ of unique ports is also large (e.g., as in a horizontal port scan), then the port score, PS, will remain small. The intention is to promote a malware behavior pattern in which malware propagation will tend to target fewer specific ports and in which malware propagation is not associated with attack sources that engage in horizontal port sweeps.

In step 708, the method 700 calculates the set of unique target IP addresses connected to the selected attack source, s. This set is referred to as TC(s). A large TC represents confirmed IP sweep behavior, which is strongly associated with the malware behavior model. In one embodiment, TC is a secondary factor to PS in computing the severity score. In a further embodiment, the final malware behavior score also accounts for the number of blacklist generation system sensors (i.e., unique user IDs) who have reported the attack source, which arguably represents the degree of consensus in the user pool that the attack source is active across the Internet. However, the IP sweep pattern is of high interest, even when the IP sweep experiences may have been reported by only a small set of sensors.

In optional step 710 (illustrated in phantom), the method 700 computes the ratio of national to international addresses that are targeted by an attack source, s, IR(s). In one embodiment, IR is a tertiary factor to PS and TC in computing the severity score. Within the pool of blacklist generation system users, one may find cases of attack sources (such as attack sources from certain countries) who exclusively target international users. However, this may also illustrate a weakness in the user pool, as there may be very few users who operate sensors within these countries. Thus, a dampening factor, $\delta$, is incorporated ($0 \le \delta \le 1$) that allows a user to express the degree to which the tertiary IR factor should be nullified in computing the final severity score for each attack source.

In step 712, the method 700 computes the malware severity score, MS(s), for the attack source, s:

$$MS(s)=PS(s)+\log(TC(s))+\delta \log(IR(s)) \quad \text{(EQN. 6)}$$

In step 714, the method 700 determines whether attack sources that may appear in the final set of blacklist entries remain (i.e., have not had a severity score computed). If the method 700 concludes in step 714 that attack sources do remain, the method 700 returns to step 704 and proceeds as described above to select a next attack source for processing. Alternatively, if the method 700 concludes in step 714 that no attack sources remain, the method 700 proceeds to step 716 and outputs the severity scores for blacklist generation (e.g., to the blacklist generation module 110). The method 700 then terminates in step 718.

The three factors calculated in steps 706-710 are computed in order of significance in mapping the malware behavior model. Logarithm is used in EQN. 6 because in the malware behavior model, the secondary metric, TC, and the tertiary metric, IR, are less important than the malware port score, PS.

As discussed above in connection with FIG. 1, the final blacklist for a given user is generated by combining the relevance ranking and severity score for each potential attack source.

Figure 8:
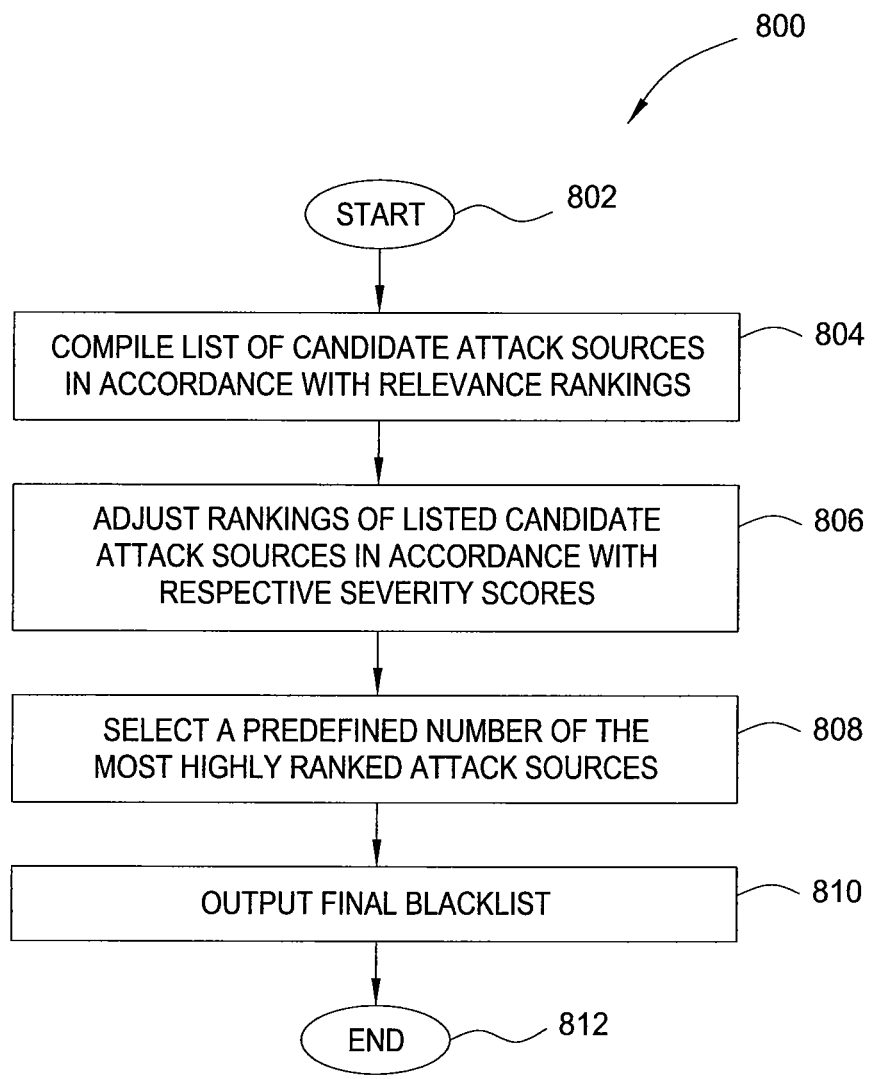
FIG. 8 is a flow diagram illustrating one embodiment of a method for generating a blacklist for use by a user, according to the present invention

FIG. 8 is a flow diagram illustrating one embodiment of a method 800 for generating a blacklist for use by a user, according to the present invention. The method 800 may be implemented, for example, by the blacklist generation module 110 of the blacklist generation system 100, illustrated above. In one embodiment, the blacklist is generated by combining the relevance ranking and severity score for each candidate attack source, as discussed in greater detail below.

The method 800 is initialized at step 802 and proceeds to step 804, where the method 800 compiles a list of attack sources who are candidates for inclusion in the blacklist, in accordance with the respective relevance rankings of these attack sources relative to the user. For the final blacklist, it is desirable to include the attack sources that have strong relevance and to exclude the non-relevant attack sources. In one embodiment, the desired length of the blacklist is L, and the respective relevance rankings of the candidate attack sources are used to compile a candidate list of size c·L (where, in one embodiment, c=2).

In step 806, the method 800 adjusts the rankings in the candidate list, in accordance with the severity scores of the candidate attack sources. This allows the method 800 to identify the L highest-ranked attacked sources. Intuitively, the adjustment should promote the rank of an attack source if the severity score indicates that the attack source is very malicious. Toward this goal, a final score is defined for each attack source that combines the attack source's relevance ranking in the candidate list with the attack source's severity score. If k is the relevance rank of an attack source s (i.e., attack source s is the $k^{th}$ entry in the candidate list), and MS is attack source s's severity score, then the final score, fin(s), is:

$$fin(s) = k - \frac{L}{2} \cdot \Phi(MS(s)) \quad \text{(EQN. 7)}$$

where $$\Phi(x) = \frac{1}{2}\left(1 + \text{erf}\left(\frac{x-\mu}{d}\right)\right) \quad \text{(EQN. 8)}$$

where erf( ) is the "S"-shaped Gaussian error function.

Figure 9:
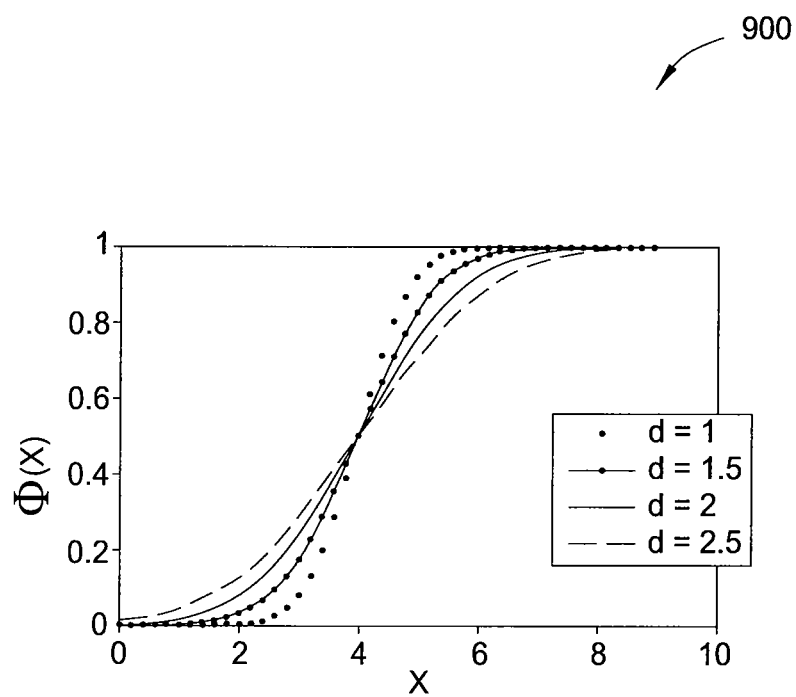
FIG. 9 is plot of $\Phi(x)$ versus x, where $\mu=4$ and the values of d vary from 1 to 2.5.

FIG. 9 is a plot 900 of $\Phi(x)$ versus x, where $\mu=4$ and the values of d vary from 1 to 2.5. As discussed above, $\Phi(MS(s))$ promotes the rank of an attack source according to its maliciousness. Thus, the larger the value of $\Phi(MS(s))$, the larger the promotion of the attack source. A $\Phi(MS(s))$ value of one would promote the attack source for one-half of the size of the final blacklist. The "S"-shaped $\Phi$( ) transforms the severity score, MS(s), into a value between zero and one. Less malicious attack sources often receive a severity score, MS, below three. After transformation of the severity scores, these attack sources will receive only small promotions. On the other hand, malicious attack sources often receive a severity score, MS, above seven. These attack sources will receive large promotions after transformation of the severity scores.

In step 808, the method 800 generates the final blacklist by sorting the final scores, fin(s), of the attack sources in the list of candidate attack sources, and then selecting the L attack sources having the smallest final scores. The method 800 then outputs the final blacklist (e.g., to the user) in step 810 before terminating in step 812.

Experimental results have shown that the blacklist generation system of the present invention have demonstrated improved hit count with respect to conventional blacklist generation systems. Hit count is a metric indicative of how many sources included within a user's blacklist are actually encountered in a predicted window of time. Moreover, the blacklist generation system of the present invention has demonstrated an improved capability to predict new attacks from attack sources not yet encountered and to incorporate attack sources relevant to a user before the attack sources have saturated the Internet.

The ability to generate a blacklist that represents a collection of source IP addresses that have been deemed to be undesirable provides many advantages. For example, the blacklist can be used by a firewall or an intrusion/prevention system, e.g., where the blacklist can be used by one or more filter rules of the firewall or intrusion/prevention system.

Figure 10:
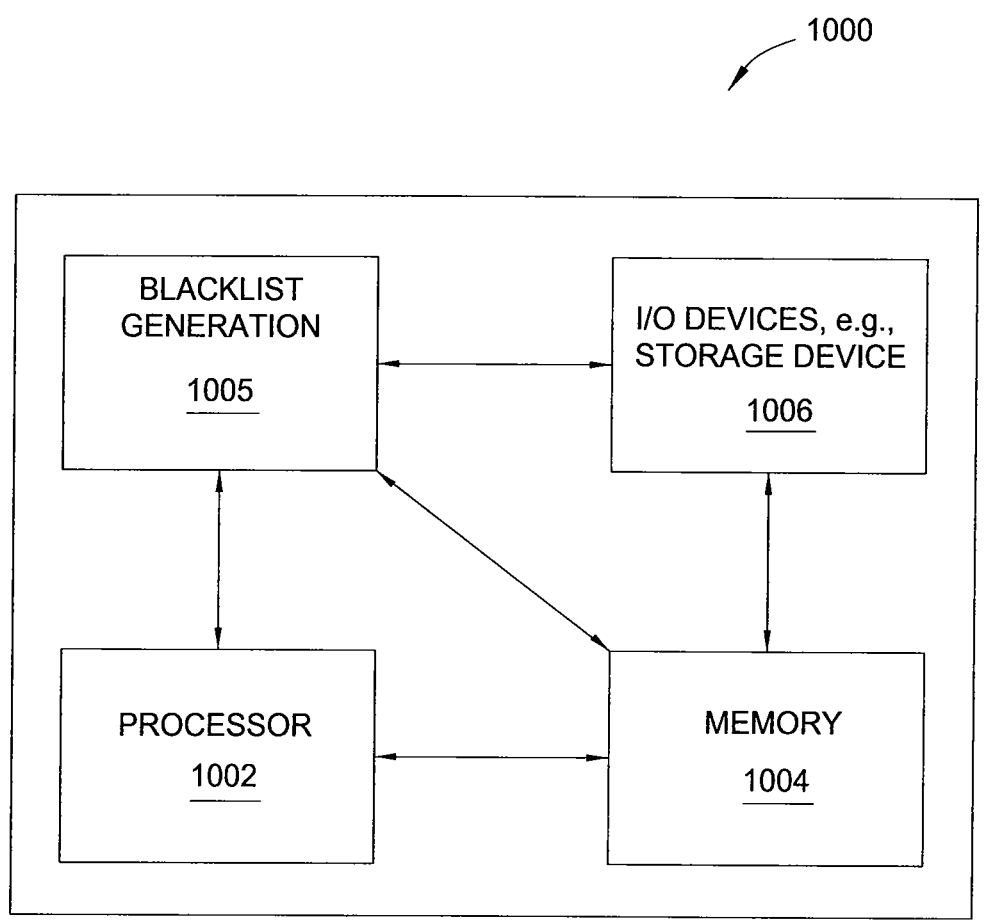
FIG. 10 is a high level block diagram of the present blacklist generation method that is implemented using a general purpose computing device.

FIG. 10 is a high level block diagram of the present blacklist generation method that is implemented using a general purpose computing device 1000. In one embodiment, a general purpose computing device 1000 comprises a processor 1002, a memory 1004, a blacklist generation module 1005 and various input/output (I/O) devices 1006 such as a display, a keyboard, a mouse, a modem, a network connection and the like. In one embodiment, at least one I/O device is a storage device (e.g., a disk drive, an optical disk drive, a floppy disk drive). It should be understood that the blacklist generation module 1005 can be implemented as a physical device or subsystem that is coupled to a processor through a communication channel.

Alternatively, the blacklist generation module 1005 can be represented by one or more software applications (or even a combination of software and hardware, e.g., using Application Specific Integrated Circuits (ASIC)), where the software is loaded from a storage medium (e.g., I/O devices 1006) and operated by the processor 1002 in the memory 1004 of the general purpose computing device 1000. Additionally, the software may run in a distributed or partitioned fashion on two or more computing devices similar to the general purpose computing device 1000. Thus, in one embodiment, the blacklist generation module 1005 for generating network address blacklists described herein with reference to the preceding figures can be stored on a computer readable medium or carrier (e.g., RAM, magnetic or optical drive or diskette, and the like).

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in the accompanying Figures that recite a determining operation or involve a decision, do not necessarily require that both branches of the determining operation be practiced. In other words, one of the branches of the determining operation can be deemed as an optional step.

Although various embodiments which incorporate the teachings of the present invention have been shown and described in detail herein, those skilled in the art can readily devise many other varied embodiments that still incorporate these teachings.

What is claimed is:

1. A method for generating a blacklist of network addresses, the method comprising:
   analyzing attack history data of a plurality of nodes of a computer network;
   computing a relevance ranking for a current attack source with respect to a first node of the computer network, the relevance ranking indicative of an attack history of the current attack source with respect to the first network node;
   propagating the relevance ranking to a second node of the computer network by applying a weight to the relevance ranking computed for the first network node, the weight indicative of a strength of an attack correlation relationship between the first network node and the second network node, the strength of the attack correlation relationship based on whether the attack history data includes data indicative of a previous attack on the first network node and the second network node, respectively, by a common attack source different than the current attack source;
   based at least partly on the propagated relevance ranking, adjusting a score of the current attack source on a list of attack sources; and
   generating a blacklist for the second network node by selecting one or more attack sources from the list of attack sources based on respective scores of the one or more selected attack sources.

2. The method of claim 1, further comprising: pre-processing the attack history data to remove noise and erroneous data.

3. The method of claim 2, wherein the erroneous data comprises one or more of: data produced from an attack source from invalid Internet Protocol address space, data produced from an attack source from unassigned Internet Protocol address space, data produced from a network address from an Internet measurement service, data produced from a web crawler, data produced from a software update source, and data produced from a timed-out network service.

4. The method of claim 1, comprising:
   for each of a plurality of attack sources:
   computing a severity score indicative of a maliciousness of the attack source;
   combining the relevance ranking and the severity score to produce a final score for the attack sources; and
   including an attack source in the blacklist when the attack source is among a predefined number of attack sources who are most highly ranked, based on the final score.

5. The method of claim 1, wherein computing the relevance ranking comprises:
   constructing a correlation graph that models an attack correlation relationship between the nodes of the network; and
   distributing a relevance of each of the attack sources in accordance with the correlation graph.

6. The method of claim 5, wherein the correlation graph comprises an edge between each pair of nodes, the edge being weighted in accordance with a correlation between the nodes in the pair of nodes.

7. The method of claim 6, wherein the correlation is based on a number of the attack sources that has attacked both of the nodes.

8. The method of claim 6, comprising, for a given attack source:
   assigning an initial relevance value at each node, the initial relevance value being based on an attack history of the given attack source relative to a node; and
   assigning a propagated relevance value for the given attack source at each neighbor of each node to which an initial relevance value has been assigned, the propagated relevance value comprising an initial relevance value multiplied by a weight of an edge connecting a node to which the initial relevance value is assigned to a neighbor to which a propagated relevance value is assigned.

9. The method of claim 8, wherein the assigning the propagated relevance value continues outward from a node to which the initial relevance value is assigned until relevance values for the given attack source at all nodes in the correlation graph have reached stable states.

10. The method of claim 4, wherein computing the severity score comprises, for a given attack source:
    calculating a malware port score for the given attack source, the malware port score indicative of a malware behavior pattern of the given attack source;
    calculating a set of unique target Internet Protocol addresses connected to the given attack source; and
    defining the severity score for the given attack source as the sum of the malware port score plus a logarithm of the set of unique target internet Protocol addresses connected to the given attack source.

11. The method of claim 10, further comprising: calculating a ratio of national Internet Protocol addresses to international Internet Protocol addresses targeted by the given attack source; and increasing the severity score by a logarithm of the ratio.

12. The method of claim 11, further comprising: dampening the logarithm by a factor having a value between zero and one.

13. The method of claim 4, wherein combining the relevance ranking and the severity score comprises:
    compiling a list of candidate attack sources;
    ranking the candidate attack sources in accordance with respective relevance rankings for the candidate attack sources; and
    adjusting the ranking of the candidate attack sources by respective severity scores for the candidate attack sources to generate the final score.

14. The method of claim 13, comprising: sorting final scores of the candidate attack sources; and selecting a predefined number of the candidate attack sources having lowest final scores.

15. A blacklist generation module embodied in one or more non-transitory computer readable storage media and configured to cause a computing device to:
    analyze first attack history data of a first network node and second attack history data of a second network node;
    identify, in the first attack history data, data indicative of an attack by a current attack source; and
    in response to determining that the second attack history data does not comprise data indicative of an attack by the current attack source:

(i) determine a relevance ranking for the current attack source with respect to the first network node, the relevance ranking indicative of an attack history of the current attack source with respect to the first network node;

(ii) propagate the relevance ranking to the second network node by applying a weight to the relevance ranking, the weight indicative of a strength of an attack correlation relationship between the first network node and the second network node, the strength of the attack correlation relationship based on whether the attack history data includes data indicative of a previous attack on the first network node and the second network node, respectively, by a common attack source different than the current attack source;

(iii) based at least partly on the relevance ranking, adjust a score of the current attack source on a list of attack sources; and (iv) generate a blacklist for the second network node by selecting one or more attack sources from the list of attack sources based on respective scores of the selected one or more attack sources on the list of attack sources.

16. The blacklist generation module of claim 15, further comprising: pre-processing the attack history data to remove noise and erroneous data.

17. The blacklist generation module of claim 16, wherein the erroneous data comprises one or more of: data produced from an attack source from invalid Internet Protocol address space, data produced from an attack source from unassigned Internet Protocol address space, data produced from a network address from an Internet measurement service, data produced from a web crawler, data produced from a software update source, and data produced from a timed-out network service.

18. The blacklist generation module of claim 15, wherein the assigning comprises, for each of the attack sources:
computing a severity score for the attack source, the severity score indicating the maliciousness of the attack source;
combining the relevance ranking and the severity score to produce a final score for the attack source; and
including the attack source in the blacklist when the attack source is among a predefined number of attack sources who are most highly ranked, based on the final score.

19. The blacklist generation module of claim 15, wherein computing the relevance ranking comprises: constructing a correlation graph that models an attack correlation relationship between the nodes of the network; and distributing a relevance of each of the attack sources in accordance with the correlation graph.

20. The blacklist generation module of claim 19, wherein the correlation graph comprises a node for each of the nodes and an edge between each pair of nodes, the edge being weighted in accordance with a correlation between nodes in the pair of nodes.

21. The blacklist generation module of claim 20, wherein the correlation is based on a number of the attack sources that has attacked both of the nodes.

22. The blacklist generation module of claim 20, wherein the distributing comprises, for a given attack source: assigning an initial relevance value at each node, the initial relevance value being based on an attack history of the given attack source relative to each node; and assigning a propagated relevance value for the given attack source at each neighbor of each node to which an initial relevance value has assigned, the propagated relevance value comprising an initial relevance value multiplied by a weight of an edge connecting a node to which the initial relevance value is assigned to a neighbor to which a propagated relevance value is assigned.

23. The blacklist generation module of claim 22, wherein the assigning the propagated relevance value continues outward from a node to which the initial relevance value is assigned until relevance values for the given attack source at all nodes in the correlation graph have reached stable states.

24. The blacklist generation module of claim 18, wherein computing the severity score comprises, for a given attack source:
calculating a malware port score for the given attack source, the malware port score indicative of a malware behavior pattern of the given attack source;
calculating a set of unique target Internet Protocol addresses connected to the given attack source; and
defining the severity score for the given attack source as the sum of the malware port score plus a logarithm of the set of unique target Internet Protocol addresses connected to the given attack source.

25. The blacklist generation module of claim 24, further comprising: calculating a ratio of national Internet Protocol addresses to international Internet Protocol addresses targeted by the given attack source; increasing the severity score by a logarithm of the ratio.

26. The blacklist generation module of claim 25, further comprising: dampening the logarithm by a factor having a value between zero and one.

27. The blacklist generation module of claim 18, wherein combining the relevance ranking and the severity score comprises: compiling a list of candidate attack sources; ranking the candidate attack sources in accordance with respective relevance rankings for the candidate attack sources; and adjusting the ranking of the candidate attack sources by respective severity scores for the candidate attack sources to generate the final score.

28. The blacklist generation module of claim 27, wherein the including comprises: sorting final scores of the candidate attack sources; and selecting a predefined number of the candidate attack sources having lowest final scores.

29. A system for generating a blacklist of network addresses, the system comprising a computing device configured to:
analyze first attack history data of a first network node and second attack history data of a second network node;
identify, in the first attack history data, data indicative of an attack by a current attack source; and
in response to determining that the second attack history data does not comprise data indicative of an attack by the current attack source:

(i) determine a relevance ranking for the current attack source with respect to the first network node, the relevance ranking indicative of an attack history of the current attack source with respect to the first network node;

(ii) propagate the relevance ranking to the second network node by applying a weight to the relevance ranking, the weight indicative of a strength of an attack correlation relationship between the first network node and the second network node, the strength of the attack correlation relationship based on whether the attack history data includes data indicative of a previous attack on the first network node and the second network node, respectively, by a common attack source different than the current attack source;

(iii) based at least partly on the relevance ranking, adjust a score of the current attack source on a list of attack sources; and (iv) generate a blacklist for the second network node by selecting one or more attack sources from the list of attack sources based on respective scores of the one or more selected attack sources on the list of attack sources.

30. The system of claim 29, comprising a plurality of sensors distributed throughout the network.

31. The system of claim 29, wherein the computing device comprises:

a severity assessment module to compute a severity score for each of the attack sources, the severity score indicating the maliciousness of the attack sources; and a blacklist generation module to combine the relevance ranking and the severity score to produce a final score for each of the attack sources.

32. The system of claim 31, wherein the blacklist generation module is further configured to include an attack source in the blacklist when the attack source is among a predefined number of attack sources who are most highly ranked, based on the final score.

33. The system of claim 31, wherein the computing device is configured to pre-process the attack history data to remove noise and erroneous data.

34. The method of claim 1, wherein the relevance ranking is higher when an attack source has attacked another one of the nodes with whom the node shares at least one common attack source than when the attack source has not attacked another one of the nodes with whom the node shares at least one common attack source.

* * * * *